No. 781,647. PATENTED FEB. 7, 1905.
W. A. GIBSON.
STEAM TRAP.
APPLICATION FILED SEPT. 16, 1903.

Witnesses
Edw. Barritt
A. C. Odell

Inventor
William A. Gibson
by Charles N. Hires

UNITED STATES PATENT OFFICE.

WILLIAM A. GIBSON, OF MUSCATINE, IOWA, ASSIGNOR TO AMERICAN GIBSON HEATER COMPANY, OF CHICAGO, ILLINOIS, A CORPORATION OF ARIZONA TERRITORY.

STEAM-TRAP.

SPECIFICATION forming part of Letters Patent No. 781,647, dated February 7, 1905.

Application filed September 16, 1903. Serial No. 173,365.

*To all whom it may concern:*

Be it known that I, WILLIAM ASA GIBSON, a citizen of the United States, and a resident of Muscatine, county of Muscatine, and State of Iowa, have invented certain new and useful Improvements in Drain and Steam Traps; and I do hereby declare that the following is a full, clear, and exact description of the same, reference being had to the accompanying drawings, and to the letters of reference marked thereon, which form a part of this specification.

This invention relates more particularly to a drain-trap adapted to permit the escape of water of condensation from any steam-containing chamber while retaining the steam therein.

Heretofore great difficulty has been experienced in draining the water of condensation automatically from the steam-chambers, while retaining the steam therein, and of the many devices for the purpose none have been found that would work under all conditions and sufficiently separate the water from the steam. Furthermore, many of the devices heretofore used, owing to the multiplicity of parts, are likely to soon get out of order, with the result of steam leakage and consequent loss.

The object of this invention is to provide a strong, simple, and cheaply-constructed trap operating expansively to close the discharge port or passage after the water has been discharged therefrom and operating by contraction to open said ports when a sufficient amount of water has gathered in the trap.

The invention consists in the matters hereinafter described, and more fully pointed out and defined in the appended claims.

Figure 1:
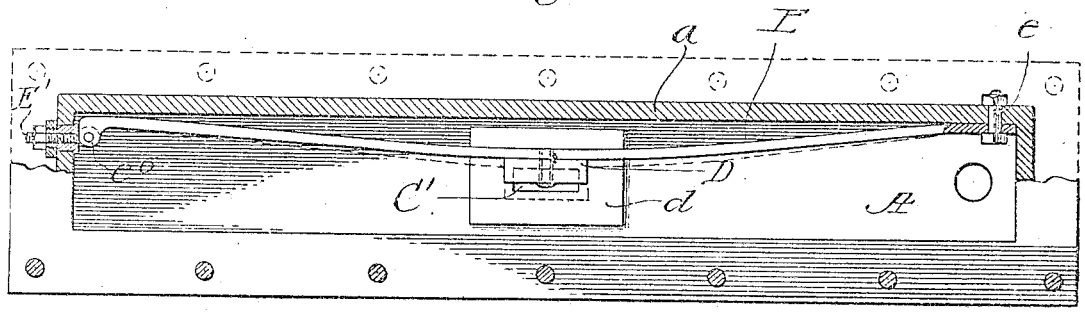
Figure 2:
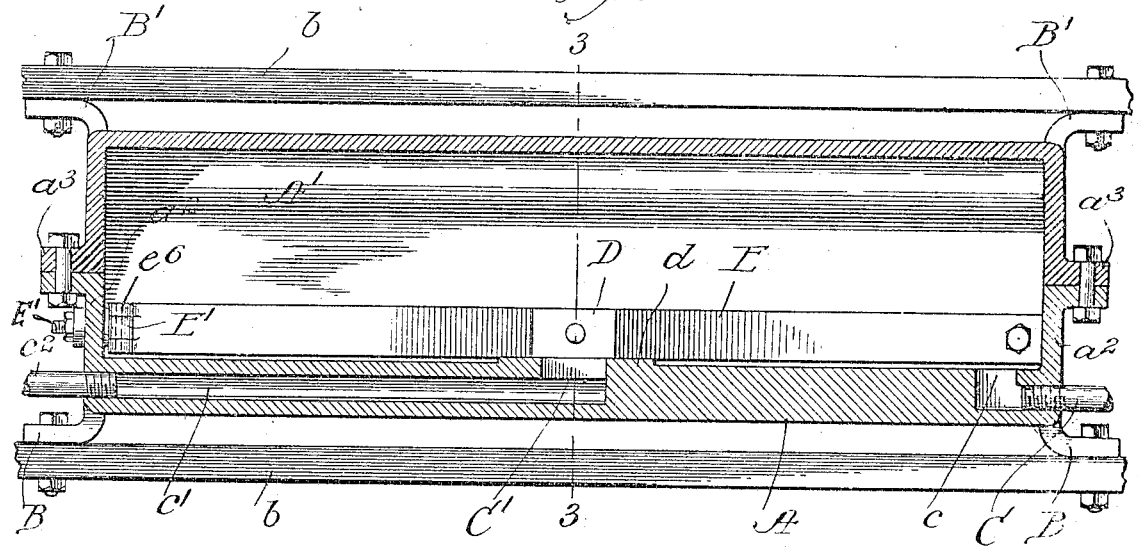
Figure 4:
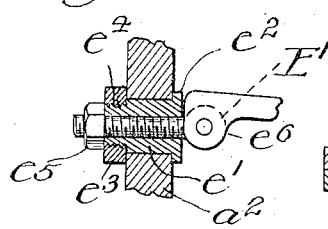
Figure 3:
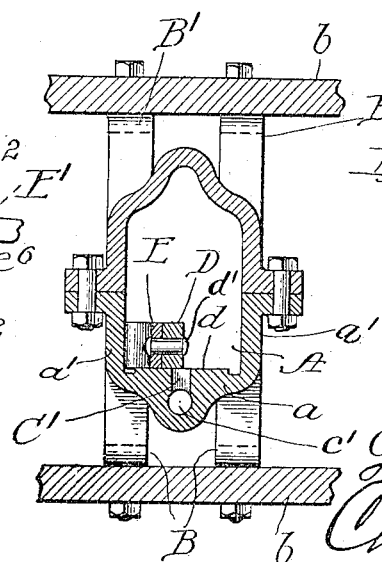

In the drawings, Figure 1 is a top plan view, partly broken, showing the operating mechanism and with the upper portion of the trap-casing removed. Fig. 2 is a central longitudinal section taken on Fig. 1. Fig. 3 is a transverse section taken on line 3 3 of Fig. 2. Fig. 4 is an enlarged detail of the adjusting connection of the expansion-bar with the trap-casing.

As shown in said drawings, A indicates as a whole the bottom half of the trap-casing and comprising a base $a$ and integral side half-walls $a'$ and end walls $a^2$. Said side and end walls are provided with outwardly-directed flanges $a^3$ at the top and ground to afford a joint with the corresponding flanges $a^3$ of the top casing-section A', which is likewise provided with integral end and side walls and together with the bottom section provides a relatively large receptacle to receive the water of condensation. Integral legs B B' are provided at each end of the casing-sections A and A', shaped to afford attachment by bolting or otherwise with any rigid support, such as the frame (indicated by $b$ $b'$) of the system with which the trap is desired to be used.

Connected in one end of the base-section A is a steam-inlet pipe C, which opens into the end of the trap through a suitable port $c$, as shown, in the bottom of the trap and through which the free flow of steam or the water condensed therefrom is permitted. An outlet-port C' is provided near the middle of the bottom A of the casing, which, as shown, is narrow transversely of said section, but extended longitudinally thereof and is in open communication with an outlet-passage $c'$, leading longitudinally through the base of the trap-section A and communicating at its ends with a discharge-pipe $c^2$. The bottom of said trap-section A about the outlet-port C' is slightly raised and faced to afford a seat $d$ for a sliding block or plate D, which is also faced on its under surface and of a length and width greater than the like dimensions of said port, so that in one position said block or plate entirely covers and closes said discharge-port and in its retracted or partly-retracted position opens said port and permits the escape of water therethrough, affording, in effect, a slide-valve. Said block or plate is actuated by means of an expansion-bar E, which is secured at one end of the lower casing-section A by a bolt $e$. The expansion-bar is usually constructed of brass, bronze, or any other metal which expands greatly when heated and is curved inwardly toward the port C' and provided centrally with a rivet $d'$, which loosely connects the plate or block D therewith. At the other end of the casing-section an internally-threaded sleeve $c'$ extends through an aperture in the end wall and is provided at its inner end with a flange $c^2$, which bears against the inner side of said end wall. At its outer end said sleeve is reduced in diameter and threaded for engagement with the nut $c^3$, which bears against the outer side of said end wall $a^2$ and is provided with a set-screw $c^4$, which engages the thread of said sleeve, so that said sleeve can be turned by the rotation of said nut. A threaded bolt $c'$, provided with an eye on its inner end, has threaded engagement in said sleeve, and a jam-nut $c^5$ is provided on the outer end thereof to hold the same in adjusted position. The end of said bar E is provided with an apertured knuckle $c^6$, which engages on each side of the head of the eyebolt and through which a pin or rivet is secured, yieldingly connecting the end of said bar with said eyebolt and acting to hold said eyebolt from turning.

The operation is as follows: When the device is assembled, the expansion-bar E is adjusted by means of the eyebolt E' at the end thereof, the pressure of the same against said bar bowing the same slightly toward the discharge-port B', so that when the same becomes heated by steam admitted through the inlet-port the expansion of said bar increases the curvature thereof and carries the block or plate D forwardly, closing the discharge-port. Said block slides on the seat $d$, surrounding said port, as is usual with a slide-valve, said seat or block mutually grinding or wearing each other to a close fit. When said aperture is completely closed, the water of condensation from the system with which the trap is connected flows into the same, gradually filling or partly filling the casing, and as there is no further circulation of steam, owing to said outlet-ports being closed, the water soon becomes cooled by radiation from the trap-casing, which affords a large radiation-surface, and the expansion-bar E contracts, again opening the outlet-port and allowing the discharge of the water therethrough. The flow will obviously continue until the water is all drained from the trap and the flow of steam therethrough is started. The inlet of hot steam into the trap, however, quickly expands the bar, and almost immediately following the discharge of the water from the trap the port is again closed, as before described. So long as water of a lower temperature than the steam remains to be discharged through the port the port necessarily remains open or partly open. Obviously by the construction described said bar E can be adjusted to quickly close the port at any given temperature and to open or partly open at any lower temperature, thus enabling the device to be employed for many different purposes than that herein described, and, furthermore, it is obvious that many details of construction may be varied and, if preferred, the expansible elements herein described as a "bar" may assume many different forms and may be differently positioned than herein shown and described without departing from the principles of my invention.

I claim as my invention—

1. A trap of the class described comprising a closed receptacle provided with an inlet and an outlet port, a slide-valve closure adapted to cover the outlet-port, expansible means connecting the valve-closure with the receptacle and acting by change of temperature to move the closure to and from the outlet-port and an adjusting-bolt hinged thereon and engaged on the receptacle adapted to regulate the movement of said closure.

2. A trap of the class described comprising a closed casing provided with an inlet and an outlet port, a valve controlling the outlet-port, a curved expansion-bar acting to open and to close said valve at predetermined temperatures and regulating means connecting said bar with the receptacle adapted to adjust the valve with respect to the outlet-port.

3. A trap of the class described comprising a closed receptacle, an outlet and an inlet port opening therein, slide-valve closure controlling said outlet-port, a curved expansion-bar connecting said slide-valve with the casing and acting to open and close said outlet-port at predetermined temperatures and means engaging thereon adapted to adjust the curvature of said bar and to adjust the valve-closure with respect to said outlet.

4. A trap of the class described comprising an upper and a lower half-casing adapted to be rigidly secured together to afford a closed receptacle, an inlet-port in one of said sections, an outlet-port, a plane seat surrounding said outlet-port, a slidable plate positioned to close the outlet-port, a curved rod attached upon the casing and loosely connected with said plate and acting by expansion and contraction to close and open the ports and adjusting means hinged on said rod adapted to adjust said plate with respect to the outlet-port.

5. A trap of the class described comprising an upper and a lower half-casing adapted to be rigidly secured together to afford a closed receptacle, an inlet-port in one of said sections, an outlet-port, a plane seat surrounding said outlet-port, a slidable plate positioned to close the outlet-port, a curved expansion-rod attached upon the casing and loosely connected with said plate and acting by means of expansion and contraction, to close the ports and adjusting means hinged to the end of said rod and adapted to regulate the curvature thereof.

6. A steam-trap comprising a closed receptacle, an inlet-port adapted for connection with a steam system, an outlet-port for the water of condensation, a slide-valve closure controlling said outlet-port, a bent bar of highly-expansible material rigidly connected at one end with the casing and intermediate its ends with said slide-valve closure and acting by expansion and contraction thereof to operate said valve and an adjusting-bolt hinged at the opposite end of said bar and adapted to adjust the valve-closure with respect to said outlet-port.

7. The combination with a closed casing, of an inlet-port opening thereinto and adapted for connection with a fluid-containing system, a discharge-port, a slide-valve closure controlling said discharge-port, an adjustable curved bar acting to control said valve and rotative means for adjusting the curvature thereof.

8. The combination with a closed metallic casing provided with an inlet and an outlet port, of a slide-valve controlling said outlet-port, a highly-expansible curved bar connected at one end with the casing, a slide-valve closure connected loosely intermediate the ends of said bar and external adjusting means connecting the other end of said bar with the casing.

In testimony whereof I have hereunto subscribed my name in the presence of two subscribing witnesses.

WILLIAM A. GIBSON.

Witnesses:
C. W. HILLS,
W. W. WITHENBURY.